Oct. 29, 1957     L. G. A. ERIKSSON     2,811,211
METHOD AND MEANS FOR STORING FOAM LIQUID
IN FIRE EXTINGUISHERS
Filed May 15, 1956
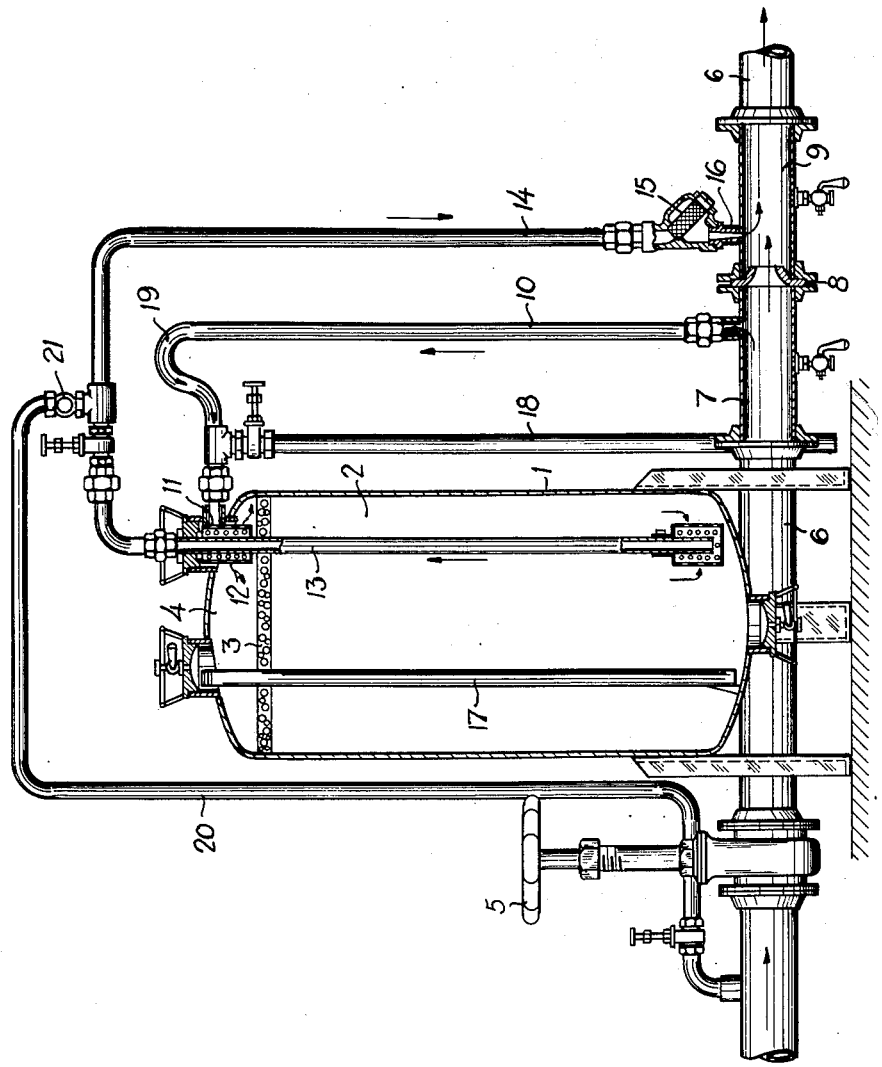
INVENTOR
LARS GUSTAV ANDERS ERIKSSON
BY
HIS ATTORNEY United States Patent Office 2,811,211
Patented Oct. 29, 1957

2,811,211

METHOD AND MEANS FOR STORING FOAM LIQUID IN FIRE EXTINGUISHERS

Lars Gustav Anders Eriksson, Goteborg, Sweden, assignor to Aktiebolaget Pumpindustri, Goteborg, Sweden, a corporation of Sweden Application May 15, 1956, Serial No. 585,018

Claims priority, application Sweden February 13, 1952

4 Claims. (Cl. 169—14)

This application is a continuation in part of my application filed November 26, 1952, Serial No. 322,647, now abandoned, and relates to method and means for storing foam liquid in fire extinguishers and specifially it pertains to a method of using a relatively thin layer of insoluble liquid of a suitable specific gravity which floats on top of the foam liquid but which is heavier than water thus keeping the water from mixing with the foam liquid.

In foam type fire extinguishers, it is very essential to have the foam liquid stored under pressure with water for instant action. However, all foam liquids and other wetting agents are extremely easily miscible with water and even though the foam liquid, being of heavier specific gravity, will sink to the bottom, after a while the water will mix with same and will impair the generation of foam when required for fire extinguishing purposes. To eliminate this difficulty and to make storage possible, still having foam liquid and water under pressure in the same tank and in readiness for instant action, I have invented a method whereby I use a relatively thin layer of an insoluble liquid to separate the foam liquid and water as will be hereinafter described.

The main object of my invention is to provide method and means of storing foam liquid with pressurized water connected in readiness for instant action.

Another object of my invention is to provide means whereby foam liquid and water can be kept in separation when not used thus giving more efficient operation when use is important.

Other objects and advantages of my invention will be apparent during the course of the following description.

In the accompanying drawing, forming a part of this specification, and in which like numerals designate like parts throughout the same, the figure represents a sectional elevation of a foam liquid storage tank with associated piping and valves embodying my invention.

In the drawing wherein for the purpose of illustration, is shown a preferred embodiment of my invention, the numeral 1 designates the storage tank which is normally filled with the foam liquid 2 up to a point near the top of the tank 1. The foam liquid usually has a specific gravity of 1.15 to 1.2. This is heavier than water and will, therefore, stay in the bottom of the tank. A relatively thin layer of a separating liquid 3 is poured in on top of the foam liquid 2. This separating layer may for example be a chloral mineral oil with an admixture of aromatic hydrocarbons, the mixture of which is so proportioned that the resulting liquid has a specific gravity in the range between water which is 1.0 and the foam liquid which as stated above is 1.15 to 1.2. This separating liquid 3 thus having a specific gravity of for example 1.1 will float on top of the foam liquid 2 and is so constituted as not to be miscible with the foam liquid nor with water. The remaining space in the tank 1 is now filled with water 4 which is under pressure.

The pipe 6 supplying water under pressure is provided with a cut-off valve 5 and a throttle flange, or Venturi tube 8 where the actual mixing takes place. Extending from the section 7 in the pipe 6 on the high pressure side of the throttle flange 8, a pipe top 10 connects through gravity seal 19 to inlet 11 on the upper part of tank 1. The water flowing through inlet 11 enters the damping device 12 which deflects the flow of the water sideways and prevents same from shooting through the layer 3 in the foam liquid 2. A rising pipe 13, having a filter 15 at its lower end, extends to the bottom of the tank 1 and serves to supply foam liquid through the conduit 14 and filter 15 to a nozzle 16, which opens into the space 9 on the low pressure side of the throttle flange 8 in the pipe 6.

The operation of my invention is as follows:

When the valve 5 is opened, the water flows through the pipe 6 into the high pressure space 7. A portion of the water, for instance 95% of the water in an equipment for an admixture of foam liquid in a quantity of 5%, flows from said space through the throttle flange 8 into the low pressure space 9 and further through the pipe 6. In the example in consideration, 5% of the total quantity of water flows from the high pressure space 7 through the conduit 10 into the tank 1 through the inlet opening 11. In the perforated cylindrical damping housing 12 the inflowing water is subjected to a primary damping of its velocity. Through the holes in the housing 12 this water is conducted out in a water layer 4, which possibly already exists, or directly out over the separating layer 3. As soon as the inflowing water has filled the whole space above the separating layer, the pressure in the tank will rise to the same value as the pressure prevailing in the high pressure space 7. During the period of a rising pressure the foam liquid 2 commences to be pressed out through the rising pipe 13 and the conduit 14, and further through the filter 15 and the foam liquid nozzle (throttle flange) 16.

When the pressure in the tank 1 has reached its full value, that is to say, a value equal to the pressure in the high pressure space 7, the pressure for the foam liquid nozzle 16 is also the same. The water and the foam liquid will thus flow into the low pressure space at the same pressure velocity. The 5% of the total quantity of water directed to the tank 1 have thus been replaced directly by a corresponding quantity of foam liquid. Obviously, this operation takes place without any disturbance by the separating layer 3, which rises and falls as the contents of water and foam liquid are changed.

If the quantity of water flowing through the throttle flange 8 is increased, the fall in pressure will at the same time increase to the low pressure space 9, and since the pressure on the foam liquid as far as to the nozzle 16 is the same as in the high pressure space 7, the fall of the pressure in the foam liquid nozzle 16 will also increase, and thus the quantity of foam liquid flowing into the low pressure space 9 also increases. The proportions of foam liquid/water in the low pressure space 9 and the pipe 6 consequently always remain the same, with the exception of immaterial variations caused by frictional losses in the pipes 10, 13 and 14 and a possible head difference.

The tank is provided with a filling pipe 17 passing through the separating layer. It is also provided with an outlet conduit 18 for the draining of water at the filling of the foam liquid, and with a gravity seal 19, which prevents this water from flowing unnecessarily to the high pressure space 7. Furthermore, a conduit 20 should be provided, through which water may be conducted to the filter 15 and the nozzle 16 for the rinsing of the latter. This conduit 20 may be provided with a non-return valve 21 which, when the apparatus functions, prevents foam liquid from unnecessarily filling the conduit 20.

It is to be understood that the form of my invention, herewith shown and described, is to be taken as a preferred example of the same and that various changes in the shape, size and arrangement of parts may be resorted to, without departing from the spirit of my invention or the scope of the subjoined claims.

Having thus described my invention, I claim:

1. A method of storing foam liquid and water under pressure, separated but in readiness for generating foam, comprising placing foam liquid of specific gravity 1.15–1.2 at the bottom of a pressure vessel, placing a thin layer of a chloral mineral oil with an admixture of aromatic hydrocarbons of specific gravity 1–1.15 on top of said water, and finally placing water of specific gravity 1.0 on top.

2. A fire extinguishing apparatus comprising a pressure vessel; a foam liquid of specific gravity 1.15–1.2 filling the major part of said vessel; a comparatively thin layer of a separating liquid of specific gravity 1–1.15 floating on top of said heavier foam liquid, said separation liquid being insoluble in water or in said foam liquid; a layer of water under pressure floating on top of said separating liquid, and means for mixing said foam liquid with water under pressure on the outside of said vessel.

3. A fire extinguishing apparatus comprising a foam liquid storage tank, said tank being filled nearly full of a foam liquid of specific gravity heavier than 1.15; the remainder of said tank being filled with water under pressure; a relatively thin layer of separating liquid being placed between said water and said foam liquid, whereby the mixture of same is prevented, said separating liquid having a specific gravity of greater than 1.0 but smaller than 1.15 and means for mixing said foam liquid with water under pressure connected to said storage tank.

4. A fire extinguishing apparatus such as described in claim 1 in which said separating liquid is a chloral mineral oil with an admixture of aromatic hydrocarbons.

References Cited in the file of this patent

UNITED STATES PATENTS 1,085,006     Barringer               Jan. 20, 1914